United States Patent
Zhou et al.

(10) Patent No.: US 12,202,368 B2
(45) Date of Patent: Jan. 21, 2025

(54) CHARGING CONTROL METHOD AND SYSTEM, AND VEHICLE

(71) Applicant: GREAT WALL MOTOR COMPANY LIMITED, Hebei (CN)

(72) Inventors: Mingwang Zhou, Baoding (CN); Shujiang Chen, Baoding (CN); Xuejing Yang, Hebei (CN)

(73) Assignee: GREAT WALL MOTOR COMPANY LIMITED, Baoding (CN)

( * ) Notice: Subject to any disclaimer, the term of this patent is extended or adjusted under 35 U.S.C. 154(b) by 118 days.

(21) Appl. No.: 17/924,162

(22) PCT Filed: Jun. 30, 2021

(86) PCT No.: PCT/CN2021/103664
§ 371 (c)(1),
(2) Date: Nov. 9, 2022

(87) PCT Pub. No.: WO2022/022212
PCT Pub. Date: Feb. 3, 2022

(65) Prior Publication Data
US 2023/0182603 A1 Jun. 15, 2023

(30) Foreign Application Priority Data
Jul. 30, 2020 (CN) .......................... 202010754831.3

(51) Int. Cl.
*B60L 53/62* (2019.01)
*H02J 7/00* (2006.01)

(52) U.S. Cl.
CPC .......... *B60L 53/62* (2019.02); *H02J 7/00714* (2020.01)

(58) Field of Classification Search
CPC .......... B60L 53/14; B60L 53/20; B60L 53/62; B60L 53/63; H02J 2310/48; H02J 7/0036;
(Continued)

(56) References Cited

U.S. PATENT DOCUMENTS 10,308,139 B2 * 6/2019 Kuramoto ............... B60L 53/65
10,770,914 B2 * 9/2020 Delevski ............. H02J 7/00714
(Continued)

FOREIGN PATENT DOCUMENTS

CN 104467079 3/2015
CN 106274521 1/2017
(Continued)

OTHER PUBLICATIONS

Chinese International Search Report for International Application No. PCT/CN2021/103664 mailed Sep. 28, 2021, (6 pages).

*Primary Examiner* — Tyler J Lee
(74) *Attorney, Agent, or Firm* — NIXON PEABODY LLP; Jeffrey L. Costellia

(57) ABSTRACT

The vehicle includes a battery pack. When the battery pack is charged by using a charging gun of a charging pile, battery pack is charged according to a smaller value between a first charging current upper limit value of a charging device and a second charging current upper limit value of the battery pack, so that the charging efficiency is improved to the greatest extent, and the charging time is shortened on the premise of ensuring safety, and a situation that the charging time is prolonged as the charging current is set to be too small is avoided; and when the battery pack is charged by using an on-board charging gun, the battery pack is charged according to a smallest value among the first charging current upper limit value of the charging device, the second charging current upper limit value of the battery pack, and a preset charging current value.

14 Claims, 6 Drawing Sheets

(58) Field of Classification Search
CPC .. H02J 7/00714; Y02T 10/70; Y02T 10/7072; Y02T 90/12; Y02T 90/14; Y02T 90/167
See application file for complete search history.

(56) References Cited

U.S. PATENT DOCUMENTS

2010/0156355 A1   6/2010  Bauerle et al.
2013/0278225 A1  10/2013  Dietze et al.

FOREIGN PATENT DOCUMENTS

| CN | 106364349 | 2/2017 |
| CN | 110509799 | 11/2019 |
| CN | 110816357 | 2/2020 |

* cited by examiner

CHARGING CONTROL METHOD AND SYSTEM, AND VEHICLE

CROSS-REFERENCE TO RELEVANT APPLICATIONS

This application is a national phase of PCT application No. PCT/CN2021/103664, filed on Jun. 30, 2021, which claims the priority of the Chinese patent application filed on Jul. 30, 2020 before the CNIPA, China National Intellectual Property Administration with the application number of 202010754831.3 and the title of "CHARGING CONTROL METHOD AND SYSTEM, AND VEHICLE", which is incorporated herein in its entirety by reference.

TECHNICAL FIELD

The present application relates to the technical field of new energy vehicles and, more particularly, to a charging control method and system, and a vehicle.

BACKGROUND

With the increasing global environmental protection problem, new energy vehicles such as electric vehicles and the like are rapidly developed.

At present, most of battery packs serving as main power sources of the electric vehicles have an external charging function, and in order to enable users to reserve charging, some of the electric vehicles are configured with a reserved charging function, and users may set a reasonable charging time according to a current vehicle state.

At present, for the external charging and reserved charging functions, users may set a charging current on the Application (APP) side and a Head Unit System (HUT) side according to the actual needs. Based on the consideration of power utilization safety, when an on-board charging gun is used for charging, the generally set charging current value is smaller; when charging is performed in a subsequent use of a charging pile or at a charging station, if the user neglects to change this setting, the charging time will be prolonged, and the user will complain.

In addition, since the conventional household sockets are mostly 250V/10 A sockets at present, the on-board charging guns are divided into 10 A charging guns and 16 A charging guns. The 10 A charging gun may be directly connected to the conventional household socket, while the 16 A charging gun cannot be directly connected to the conventional household socket. Some users privately repack the conventional household socket, such that the conventional household socket may be connected to the 16 A charging gun, but the socket after the repacking appears generating heat, burns out or even causes fire after being connected to the 16 A charging gun.

SUMMARY

In view of this, the present application aims to provide a charging control method and system, and a vehicle, so as to solve the problem that a current control manner for charging a vehicle battery pack is unreasonable in the prior art, and a user is prone to complain.

To achieve the above object, the technical solutions of the application are implemented as follows.

A charging control method applied to an on-board charger of a vehicle, wherein the vehicle further includes a battery pack, and the method includes:

when it is detected that a charging device is connected, determining a type of the charging device, a first charging current upper limit value of the charging device, a second charging current upper limit value of the battery pack and a preset charging current value;

when the charging device includes a charging gun of a charging pile, charging the battery pack according to a smaller value between the first charging current upper limit value and the second charging current upper limit value; and when the charging device includes an on-board charging gun, charging the battery pack according to the smallest value among the first charging current upper limit value, the second charging current upper limit value and the preset charging current value.

Further, in the method, when the charging device includes the charging gun of the charging pile, charging the battery pack according to the smaller value between the first charging current upper limit value and the second charging current upper limit value includes:

when the charging device includes the charging gun of the charging pile, setting the preset charging current value as a third charging current upper limit value, and charging the battery pack according to the smaller value between the first charging current upper limit value and the second charging current upper limit value, wherein the third charging current upper limit value is a charging current upper limit value of the on-board charger.

Further, in the method, when the charging device includes the on-board charging gun, charging the battery pack according to the smallest value among the first charging current upper limit value, the second charging current upper limit value and the preset charging current value includes:

when the charging device includes a 10 A on-board charging gun, charging the battery pack according to the smallest value among the first charging current upper limit value, the preset charging current value and the second charging current upper limit value;

when the charging device includes a 16 A on-board charging gun, and when the preset charging current value is greater than a fourth charging current upper limit value, charging the battery pack according to a smallest value among the first charging current upper limit value, the second charging current upper limit value and the fourth charging current upper limit value; wherein, the fourth charging current upper limit value is an operating current upper limit value of a household socket; and when the charging device includes the 16 A on-board charging gun, and when the preset charging current value is less than or equal to the fourth charging current upper limit value, charging the battery pack according to the smallest value among the first charging current upper limit value, the second charging current upper limit value and the preset charging current value.

Further, in the method, the vehicle further includes a vehicle controller, the vehicle controller is electrically connected to the on-board charger, and before when it is detected that the charging device is connected, determining the type of the charging device, the first charging current upper limit value of the charging device, the second charging current upper limit value of the battery pack and the preset charging current value, the method further includes:

when it is detected that the charging device is plugged in the on-board charger, and when a charging connection confirm signal and a control confirm signal are received within a preset time, sending a charging signal to the vehicle controller, so that the vehicle controller executes a charging power-on process and determines that the charging device is connected; and when it is detected that the charging device is plugged in the on-board charger, and when the charging connection confirm signal or the control confirm signal is not received within the preset time, sending a power-off signal to the vehicle controller, so that the vehicle controller executes a charging power-off process.

Further, in the method, different types of charging devices are configured with resistor modules of different resistance values, and the charging connection confirm signal includes the resistance value of the resistor module; and determining the type of the charging device includes:

determining a resistance value of the charging device according to the charging connection confirm signal; and determining the type of the charging device according to the resistance value.

Another object of the embodiment of the present application also aims to provide a charging control system applied to an on-board charger of a vehicle, wherein the vehicle further includes a battery pack, and the system includes:

a determining module configured for, when it is detected that a charging device is connected, determining a type of the charging device, a first charging current upper limit value of the charging device, a second charging current upper limit value of the battery pack and a preset charging current value;

a first charging module configured for, when the charging device includes a charging gun of a charging pile, charging the battery pack according to the smaller value between the first charging current upper limit value and the second charging current upper limit value; and a second charging module configured for, when the charging device includes an on-board charging gun, charging the battery pack according to the smallest value among the first charging current upper limit value, the second charging current upper limit value and the preset charging current value.

Further, in the charging control system, the first charging module is specifically configured for, when the charging device includes the charging gun of the charging pile, setting the preset charging current value as a third charging current upper limit value, and charging the battery pack according to the smaller value between the first charging current upper limit value and the second charging current upper limit value, wherein the third charging current upper limit value is a charging current upper limit value of the on-board charger.

Further, in the charging control system, the second charging module includes:

a first charging unit configured for, when the charging device includes a 10 A on-board charging gun, charging the battery pack according to the smallest value among the first charging current upper limit value, the preset charging current value and the second charging current upper limit value;

a second charging unit configured for, when the charging device includes a 16 A on-board charging gun, and when the preset charging current value is greater than a fourth charging current upper limit value, charging the battery pack according to a smallest value among the first charging current upper limit value, the second charging current upper limit value and the fourth charging current upper limit value; wherein, the fourth charging current upper limit value is an operating current upper limit value of a household socket; and a third charging unit configured for, when the charging device includes the 16 A on-board charging gun, and when the preset charging current value is less than or equal to the fourth charging current upper limit value, charging the battery pack according to the smallest value among the first charging current upper limit value, the second charging current upper limit value and the preset charging current value.

Further, in the charging control system, the vehicle further includes a vehicle controller, the vehicle controller is electrically connected to the on-board charger, and the system further includes:

a first control module configured for, before when it is detected that the charging device is connected, determining the type of the charging device, the first charging current upper limit value of the charging device, the second charging current upper limit value of the battery pack and the preset charging current value, when it is detected that the charging device is plugged in the on-board charger, and when a charging connection confirm signal and a control confirm signal are received within a preset time, sending a charging signal to the vehicle controller, so that the vehicle controller executes a charging power-on process and determines that the charging device is connected; and a second control module configured for, when it is detected that the charging device is plugged in the on-board charger, and when the charging connection confirm signal or the control confirm signal is not received within the preset time, sending a power-off signal to the vehicle controller, so that the vehicle controller executes a charging power-off process.

Further, in the charging control system, different types of charging devices are configured with resistor modules of different resistance values, and the charging connection confirm signal includes the resistance value of the resistor module; and the determining module includes:

a first determining unit configured for determining a resistance value of the charging device according to the charging connection confirm signal; and a second determining unit configured for determining the type of the charging device according to the resistance value.

Yet another object of the present application also aims to provide a vehicle, wherein the vehicle includes an on-board charger, the vehicle further includes a battery pack, and the vehicle further includes the charging control system as described above.

Compared with the prior art, the charging control method, the charging control system and the vehicle according to the present application have the following advantages:

when it is detected that the charging device is connected, the type of the charging device, the first charging current upper limit value of the charging device, the second charging current upper limit value of the battery pack and the preset charging current value are determined; when the charging device includes the charging gun of the charging pile, the battery pack is charged according to the smaller value between the first charging current upper limit value and the second charging current upper limit value; and when the charging device includes the on-board charging gun, the battery pack is charged according to the smallest value among the first charging current upper limit value, the second charging current upper limit value and the preset charging current value. When the battery pack is charged by using the charging gun of the charging pile, the battery pack is charged according to the smaller value between the first charging current upper limit value of the charger and the second charging current upper limit value of the battery pack, so that the charging efficiency is improved to the greatest extent, and the charging time is shortened on the premise of ensuring safety, and a situation that the charging time is prolonged as the charging current is set to be too small is avoided; and when the battery pack is charged by using the on-board charging gun, the battery pack is charged according to the smallest value among the first charging current upper limit value of the charger, the second charging current upper limit value of the battery pack, and the preset charging current value, which meets the personalized charging requirements of the users on the premise of ensuring the safety.

The above description is merely a summary of the technical solutions of the present application. In order to more clearly know the technical means of the present application to enable the implementation according to the contents of the description, and in order to make the above and other objects, features and advantages of the present application more apparent and understandable, the particular embodiments of the present application are provided below.

BRIEF DESCRIPTION OF THE DRAWINGS

In order to more clearly illustrate the technical solutions of the embodiments of the present application or the related art, the drawings that are required to describe the embodiments or the related art will be briefly introduced below. Apparently, the drawings that are described below are embodiments of the present application, and a person skilled in the art may obtain other drawings according to these drawings without paying creative work.

The drawings constituting a part of the application are used to provide a further understanding of the application, and the illustrative embodiments of the application and the description thereof serve to explain the application, and do not constitute any inappropriate definition to the application. In the drawings.

DETAILED DESCRIPTION OF THE EMBODIMENTS

Figure 1:
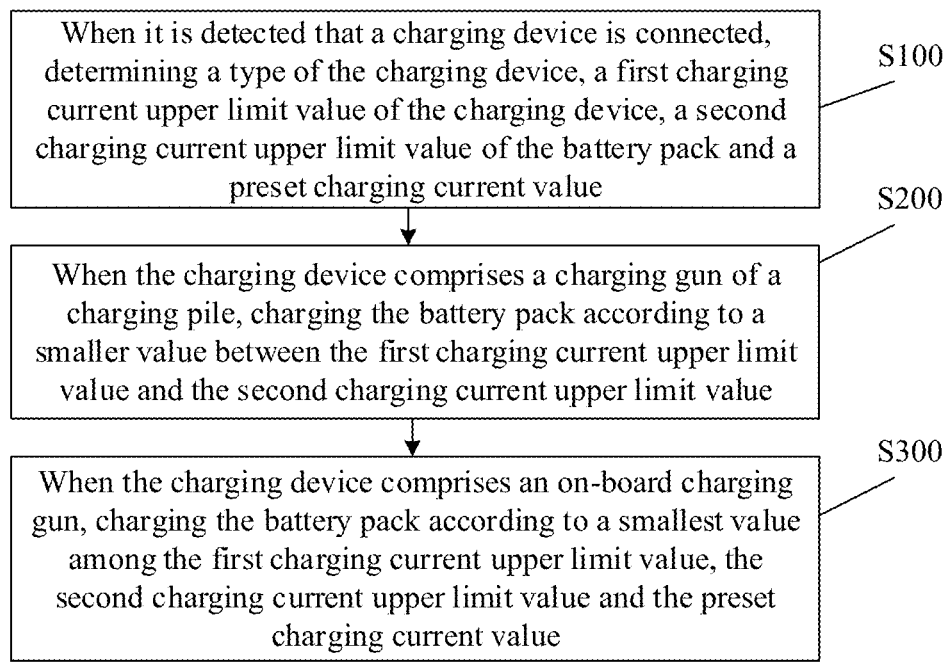
FIG. 1 is a flow chart of a charging control method according to an embodiment of the present application.

In order to make the objects, the technical solutions and the advantages of the embodiments of the present application clearer, the technical solutions of the embodiments of the present application will be clearly and completely described below with reference to the drawings of the embodiments of the present application. Apparently, the described embodiments are merely certain embodiments of the present application, rather than all of the embodiments. All of the other embodiments that a person skilled in the art obtains on the basis of the embodiments of the present application without paying creative work fall within the protection scope of the present application.

The embodiments of the present application will be described in further detail hereinafter with reference to the drawings. Although the embodiments of the present application are shown in the drawings, it should be understood that the present application may be embodied in various forms and should not be construed as limited to the embodiments set forth herein. On the contrary, these embodiments are provided so that the present application will be understood more thoroughly, and the scope of the present application may be perfectly conveyed to those skilled in the art.

It should be noted that, in case of no conflict, the embodiments in the application and the features in the embodiments may be combined with each other.

The present application will be explained in detail with reference to the drawings and embodiments hereinafter.

Please refer to FIG. 1, which shows a flow chart of a charging control method according to an embodiment of the present application. The charging control method according to the embodiment of the present application is applied to an on-board charger of a vehicle, and the vehicle further includes a battery pack, wherein the method includes steps S100 to S300.

In the embodiment of the present application, the On-board charger (OBC) is in communication connection with a vehicle controller of the vehicle and a Battery Management System (BMS) of the battery pack. The on-board charger may dynamically adjust a charging current or voltage parameters according to data according to the BMS, execute corresponding actions and complete a charging process. Meanwhile, the on-board charger may also communicate with the vehicle controller through a high-speed Controller Area Network (CAN), upload a working state, working parameters and fault warning information of the charger, and receive control commands to start charging or stop charging.

In the charging process, the on-board charger may ensure that a temperature, a charging voltage and a current of the battery pack do not exceed allowable values; and has a function of limiting a voltage of a single battery, and automatically and dynamically adjusts the charging current according to battery information of the BMS. The on-board charger may also automatically judge whether a charging device and a charging cable are correctly connected. The on-board charger may allow the charging process to be started only when the on-board charger is correctly connected to a charging pile and the battery. When the charger detects that the connection with the charging pile or the battery is abnormal, the charging is immediately stopped. In addition, the vehicle cannot be started before the charger is connected to the power battery.

Step S100: when it is detected that a charging device is connected, determining a type of the charging device, a first charging current upper limit value of the charging device, a second charging current upper limit value of the battery pack and a preset charging current value.

In the step S100, the charging device refers to a device for charging the battery pack, and may be specifically classified into an on-board charging gun and a charging gun of a charging pile. The on-board charging gun is independent charging device and may be directly connected to a power grid through a gun holder or a socket; while the charging gun of the charging pile includes a gun head and a charging pile electrically connected to the gun head. Different connection signals may be generated when different types of charging guns are plugged in a charging port of the on-board charger connected to the battery pack. When a connection signal of the charging device is received, it is indicated that the charging device is plugged in the charging port, so that it may be detected the charging device is connected, indicating that the battery pack needs to be charged. Meanwhile, the specific type of the charging device connected to the on-board may be determined according to the connection signal, so as to determine a current upper limit value that the charging device may allow to supply power subsequently.

In the step S100, the charging gun of each type has a corresponding maximum charging current, and the maximum charging currents allowed by the charging guns of different types are different, so that after the type of the charging device is determined, the charging current upper limit value of the charging device, that is, the first charging current upper limit value, may also be determined. Because the on-board charger of the battery pack is in communication connection with the battery management system, the charging current upper limit value of the battery pack, that is, the second charging current upper limit value, may be acquired through the battery management system. In addition, because the vehicle on-board charger is in communication connection with the vehicle controller through the CAN network, and the vehicle controller may receive charging current setting through the APP end or the Head Unit System end, the on-board charger may acquire the current value, that is, the above preset charging current value, determined by the above charging current setting. In practical applications, the preset charging current value may be set by a user according to the needs of the user.

Step S200: when the charging device includes a charging gun of a charging pile, charging the battery pack according to the smaller value between the first charging current upper limit value and the second charging current upper limit value.

In the step S200, when the battery pack of the vehicle is charged by using the charging gun of the charging pile, it is indicated that the user wishes to perform quick charging at current. In this case, the battery pack is charged by using the smaller value between the first charging current upper limit value and the second charging current upper limit value, so that the battery pack may be charged by using the maximum charging current and the maximum charging power on the premise of ensuring the power utilization safety, thereby reducing the problem of prolonging the charging time of the charging pile due to the use of the smaller preset charging current default in the vehicle or set by the user, reducing the charging time, and avoiding customer complaints.

In the step S200, it is equivalent to neglect the original charging current setting of the vehicle when charging is performed by using the charging pile, so as to achieve a quick charging effect.

S300: when the charging device includes an on-board charging gun, charging the battery pack according to the smallest value among the first charging current upper limit value, the second charging current upper limit value and the preset charging current value.

In the above step S300, since the user is likely to set the charging current based on the actual need or actual situation of the user when the vehicle is charged by using the on-board charging gun, the user wants to charge the vehicle with the set preset charging current. In this case, charging the battery pack with the smallest value among the first charging current upper limit value, the second charging current upper limit value and the preset charging current value may ensure that the battery pack is charged with the preset charging current value default in the vehicle or set by the user on the premise of ensuring the power utilization safety, so as to meet the actual charging requirements of the user.

Compared with the prior art, the charging control method according to the present application has the following advantages:

when the battery pack is charged by using the charging gun of the charging pile, the battery pack is charged according to the smaller value between the first charging current upper limit value of the charger and the second charging current upper limit value of the battery pack, so that the charging efficiency is improved to the greatest extent, and the charging time is shortened on the premise of ensuring safety, and a situation that the charging time is prolonged as the charging current is set to be too small is avoided; and when the battery pack is charged by using the on-board charging gun, the battery pack is charged according to the smallest value among the first charging current upper limit value of the charging device, the second charging current upper limit value of the battery pack, and the preset charging current value, which meets the personalized charging requirements of the users on the premise of ensuring the safety.

Optionally, the vehicle further includes a vehicle controller, and the vehicle controller is electrically connected to the on-board charger. In an implementation, the charging control method according to the embodiment of the present application further includes steps S1001 to S1002 before the step S100.

Step S1001: when it is detected that the charging device is plugged in the on-board charger, and when a charging connection confirm signal and a control confirm signal are received within a preset time, sending a charging signal to the vehicle controller, so that the vehicle controller executes a charging power-on process and determines that the charging device is connected.

In the step S1001, the charging connection confirm signal is a signal for determining that the charging device is normally connected to a power grid, while the control confirm signal is a signal for determining that the on-board charger, the vehicle and the charging device are normally connected. In other words, the on-board charger is reflected. Since the on-board charger is electrically connected to the vehicle controller of the vehicle, after the charging device is plugged in the on-board charger, the vehicle controller may be awakened, and Connection Confirm (CC) and charging Control Pilot (CP) may be performed. The charging connection confirm is used for determining whether the on-board charger is normally connected to the power grid, and specifically, it is judged whether the charging device is plugged by detecting a voltage condition of the CC signal; while the charging control confirm is used for determining whether the on-board charger is normally connected to the vehicle, specifically, after the CC connection confirm signal is normal, the charging device, the on-board charger and a control system related to vehicle charging perform self-checking and mutual checking, and perform control connection confirmation, and a control connection condition is determined through a voltage of the CP signal. The CP signal is a PWM signal with a frequency of 1 KHz, and a maximum output current of the on-board charger may be set through a duty ratio of the CP signal.

In the step S1001, the preset time is a preset longest waiting time for waiting for a charging line to be ready after the charging device is plugged in the on-board charger, and when the charging confirmation is not completed after the preset time exceeds, the entire vehicle enters a state of dormancy. The preset time is a value to be determined (TBD), and may be set as 3 seconds or 10 minutes, for example, and may be specifically set as needed.

In the step S1001, a charging signal is sent to the vehicle controller only when the charging connection confirm signal and the control confirm signal are received within the preset time, so that the vehicle controller executes the charging power-on process, and determines that the charging device is connected, and then executes subsequent charging operation, thereby avoiding an accident such as fire, explosion, and the like caused by an excessively large contact resistance between the charging device and the socket due to forced charging when the charging device is not plugged.

Step S1002: when it is detected that the charging device is plugged into the on-board charger, and when the charging connection confirm signal or the control confirm signal is not received within the preset time, sending a power-off signal to the vehicle controller, so that the vehicle controller executes a charging power-off process.

In the step S1002, when the charging connection confirm signal or the control confirm signal is not received within the preset time, it is determined that the charging line cannot be prepared, and the entire vehicle is already in a wake-up state in this case. Based on the consideration of saving electric energy, the on-board charger sends the power-off signal to the vehicle controller, so that the vehicle controller executes the charging power-off process.

In the present embodiment, when it is detected that the charging device is plugged and the charging connection confirm signal and the control confirm signal are received within the preset time, the vehicle controller executes the charging power-on process and determines that the charging device is connected, and then executes the subsequent charging operation, thereby avoiding the accident such as fire, explosion, and the like caused by the excessively large contact resistance between the charging device and the socket due to forced charging when the charging device is not plugged.

Optionally, in a specific implementation, different types of charging devices are configured with resistor modules of different resistance values, and the charging connection confirm signal includes the resistance value of the resistor module; and the determining the type of the charging device includes: determining a resistance value of the charging device according to the charging connection confirm signal; and determining the type of the charging device according to the resistance value.

Because a gun head of the charging gun of the charging device is each provided with the resistor module that reflects a cable capacity, the resistor modules of different resistance values have different cable thicknesses. For example, when the resistance value is 1.5 KΩ, it is indicated that the cable capacity of the charging device is 10 A, and the corresponding charging gun is a 10 A on-board charging gun. When the resistance value is 680Ω, it is indicated that the current capacity value of the cable of the charging device is 16 A, and the corresponding charging gun is a 16 A on-board charging gun. When the resistance value is 220Ω, it is indicated that the current capacity value of the cable of the charging device is 32 A, and the corresponding charging gun is a charging gun of a charging pile. In practical applications, the resistor modules are RC resistors.

Optionally, in an implementation, the step S200 specifically includes step S201.

Step S201: when the charging device includes the charging gun of the charging pile, setting the preset charging current value as a third charging current upper limit value, and charging the battery pack according to the smaller value between the first charging current upper limit value and the second charging current upper limit value, wherein the third charging current upper limit value is a charging current upper limit value of the on-board charger.

In this implementation, when the charging gun of the charging pile is used for charging the vehicle, the on-board charger adjusts the set default value of the charging current to the charging current upper limit value, i.e., the third charging current upper limit value, that the on-board charger may bear, so that the vehicle may be charged with the maximum charging current and the maximum charging power.

For example, for a 3.3 kw charger, the third charging current upper limit value is 16 A. For a 6.6 kw charger, the third charging current upper limit value is 32 A.

Optionally, in an implementation, the step S300 includes steps S301 to S303:

Step S301: when the charging device includes a 10 A on-board charging gun, charging the battery pack according to the smallest value among the first charging current upper limit value, the preset charging current value and the second charging current upper limit value.

In the step S301, since the 10 A on-board charging gun may be directly plugged into a household socket, and a maximum allowable charging current of the 10 A on-board charging gun is 8 A, which is smaller than a maximum operating current of the household socket, when it is determined that the charging device connected to the on-board charger is the 10 A on-board charging gun, the battery pack is directly charged according to the smallest value among the first charging current upper limit value of the charging device, the preset charging current value, and the second charging current upper limit value of the battery pack acquired in the step S100, which may charge the battery pack according to the actual use requirement of the user on the premise of ensuring the use safety.

Step S302: when the charging device includes a 16 A on-board charging gun, and when the preset charging current value is greater than a fourth charging current upper limit value, charging the battery pack according to a smallest value among the first charging current upper limit value, the second charging current upper limit value and the fourth charging current upper limit value; wherein, the fourth charging current upper limit value is an operating current upper limit value of the household socket.

In the step S302, since the 16 A on-board charging gun cannot be directly plugged into the household socket, some users privately repack the conventional household socket, such that the conventional household socket may be connected to the 16 A charging gun. However, because a maximum allowable charging current of the 16 A on-board charging gun is 13 A, which is greater than the maximum operating current of the household socket, the repacked socket is easy to generate heat, burn or even cause fire after being connected to the 16 A on-board charging gun. In order to avoid power utilization dangers caused by the fact that the user charges the vehicle by using the repacked household socket for the 16 A on-board charging gun to be plugged in, when it is determined that the charging device connected to the on-board charger is a 16 A on-board charging gun, if the preset charging current value is greater than the maximum operating current of the household socket, the battery pack is charged directly according to the smallest value among the first charging current upper limit value of the charging device, the second charging current upper limit value of the battery pack and the maximum operating current of the household socket, which are acquired in the step S100, so that the vehicle may be charged according to the actual use requirements of the user on the premise of guaranteeing the use safety no matter the user uses the 16 A on-board charging gun to charge the battery pack through the repacked household socket. In practical applications, the fourth charging current upper limit value is 10 A.

In practical applications, when the step S302 is executed, the vehicle controller may be triggered to send a prompt message to a display unit of the vehicle, so as to display a current charging state on a central control display screen or an instrument panel. The charging state includes a charging current value.

Step S303: when the charging device includes the 16 A on-board charging gun, and when the preset charging current value is less than or equal to the fourth charging current upper limit value, charging the battery pack according to the smallest value among the first charging current upper limit value, the second charging current upper limit value and the preset charging current value.

In the step S303, in order to avoid power utilization dangers caused by the fact that the user charges the vehicle by using the repacked household socket for the 16 A on-board charging gun to be plugged in, when it is determined that the charging device connected to the on-board charger is a 16 A on-board charging gun, if the preset charging current value is less than or equal to the maximum operating current of the household socket, the battery pack is charged directly according to the smallest value among the first charging current upper limit value of the charging device, the preset charging current value and the second charging current upper limit value of the battery pack, which are acquired in the step S100, so that the vehicle may be charged according to the actual use requirements of the user on the premise of guaranteeing the use safety no matter the user uses the 16 A on-board charging gun to charge the battery pack through the repacked household socket.

In the present embodiment, different charging current determining modes are set for different types of on-board charging guns, so that the user may charge the vehicles according to the actual use requirements of the user on the premise of ensuring the use safety when charging the vehicles with the on-board charging gun, thus avoiding the problem of power utilization dangers caused by using the repacked household socket to plug the 16 A on-board charging gun to charge the vehicle.

Figure 2:
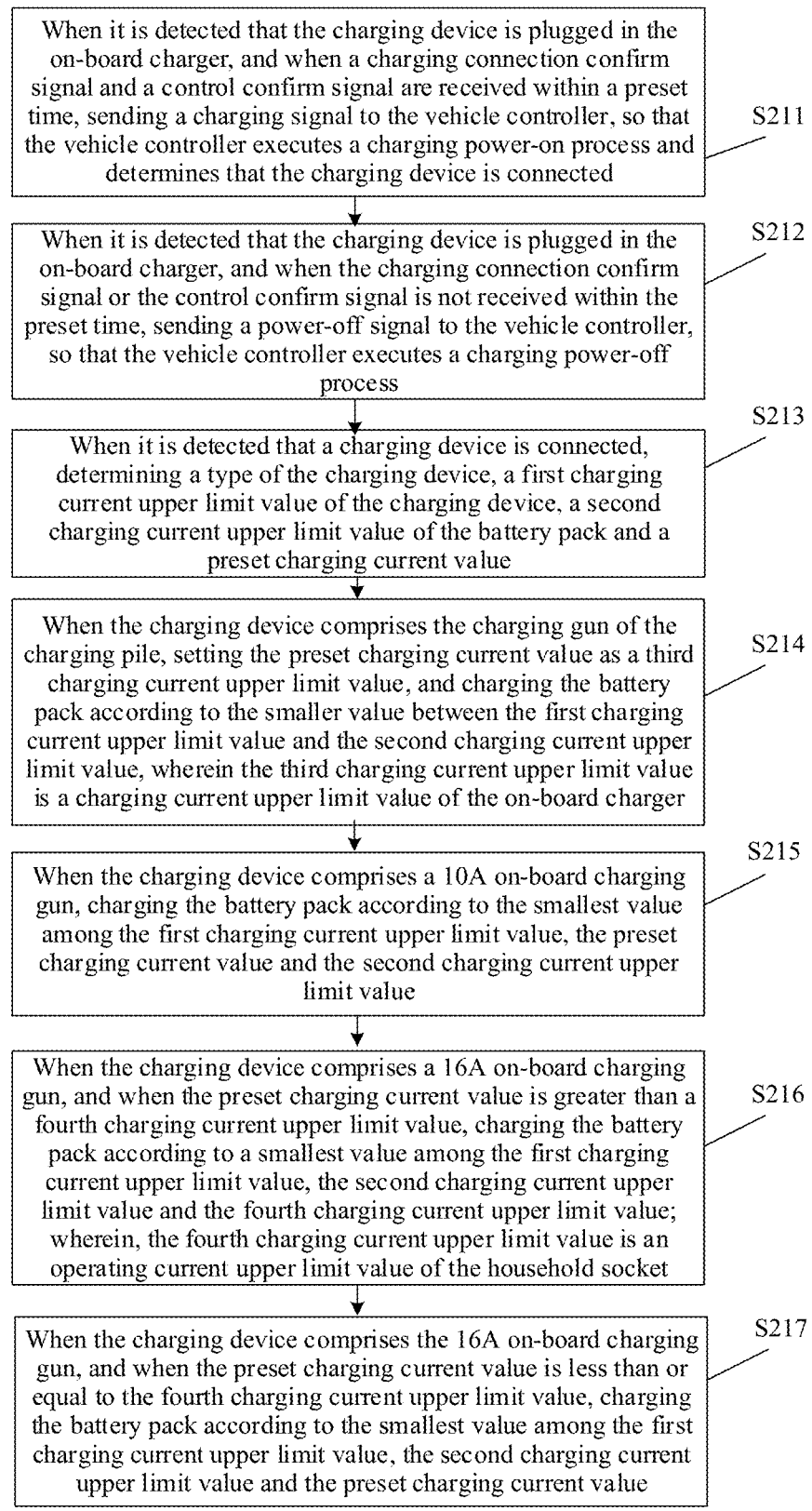
FIG. 2 is a flow chart of a charging control method according to a preferred embodiment of the present application.

Please refer to FIG. 2, which shows a flow chart of a charging control method according to a preferred embodiment of the present application. The charging control method according to the embodiment of the present application is applied to an on-board charger of a vehicle, the vehicle further includes a battery pack and a vehicle controller, and the vehicle controller is electrically connected to the on-board charger, wherein the method includes steps S211 to S216.

Step S211: when it is detected that the charging device is plugged in the on-board charger, and when a charging connection confirm signal and a control confirm signal are received within a preset time, sending a charging signal to the vehicle controller, so that the vehicle controller executes a charging power-on process and determines that the charging device is connected.

For the above step S211, reference may be made to the detailed description of the step S1001, and details are not described herein again.

Step S212: when it is detected that the charging device is plugged in the on-board charger, and when the charging connection confirm signal or the control confirm signal is not received within the preset time, sending a power-off signal to the vehicle controller, so that the vehicle controller executes a charging power-off process.

For the above step S212, reference may be made to the detailed description of the step S1002, and details are not described herein again.

Step S213: when it is detected that a charging device is connected, determining a type of the charging device, a first charging current upper limit value of the charging device, a second charging current upper limit value of the battery pack and a preset charging current value.

For the above step S213, reference may be made to the detailed description of the step S100, and details are not described herein again.

Step S214: when the charging device includes the charging gun of the charging pile, setting the preset charging current value as a third charging current upper limit value, and charging the battery pack according to the smaller value between the first charging current upper limit value and the second charging current upper limit value, wherein the third charging current upper limit value is a charging current upper limit value of the on-board charger.

For the above step S214, reference may be made to the detailed description of the step S201, and details are not described herein again.

Step S215: when the charging device includes a 10 A on-board charging gun, charging the battery pack according to the smallest value among the first charging current upper limit value, the preset charging current value and the second charging current upper limit value.

For the above step S215, reference may be made to the detailed description of the step S301, and details are not described herein again.

Step S216: when the charging device includes a 16 A on-board charging gun, and when the preset charging current value is greater than a fourth charging current upper limit value, charging the battery pack according to the smallest value among the first charging current upper limit value, the second charging current upper limit value and the fourth charging current upper limit value; wherein, the fourth charging current upper limit value is an operating current upper limit value of the household socket.

For the above step S216, reference may be made to the detailed description of the step S302, and details are not described herein again.

Step S217: when the charging device includes the 16 A on-board charging gun, and when the preset charging current value is less than or equal to the fourth charging current upper limit value, charging the battery pack according to the smallest value among the first charging current upper limit value, the second charging current upper limit value and the preset charging current value.

For the above step S217, reference may be made to the detailed description of the step S303, and details are not described herein again.

Compared with the prior art, the charging control method according to the embodiment of the present application has the following advantages:

when the battery pack is charged by using the charging gun of the charging pile, the battery pack is charged according to the smaller value between the first charging current upper limit value of the charger and the second charging current upper limit value of the battery pack, so that the charging efficiency is improved to the greatest extent, and the charging time is shortened on the premise of ensuring safety, and a situation that the charging time is prolonged as the charging current is set to be too small is avoided; and when the battery pack is charged by using the on-board charging gun, different charging current determining modes are set for different types of on-board charging guns, so that the user may charge the vehicles according to the actual use requirements of the user on the premise of ensuring the use safety when charging the vehicles with the on-board charging gun, thus avoiding the problem of power utilization dangers caused by using the repacked household socket to plug the 16 A on-board charging gun to charge the vehicle.

Figure 3:
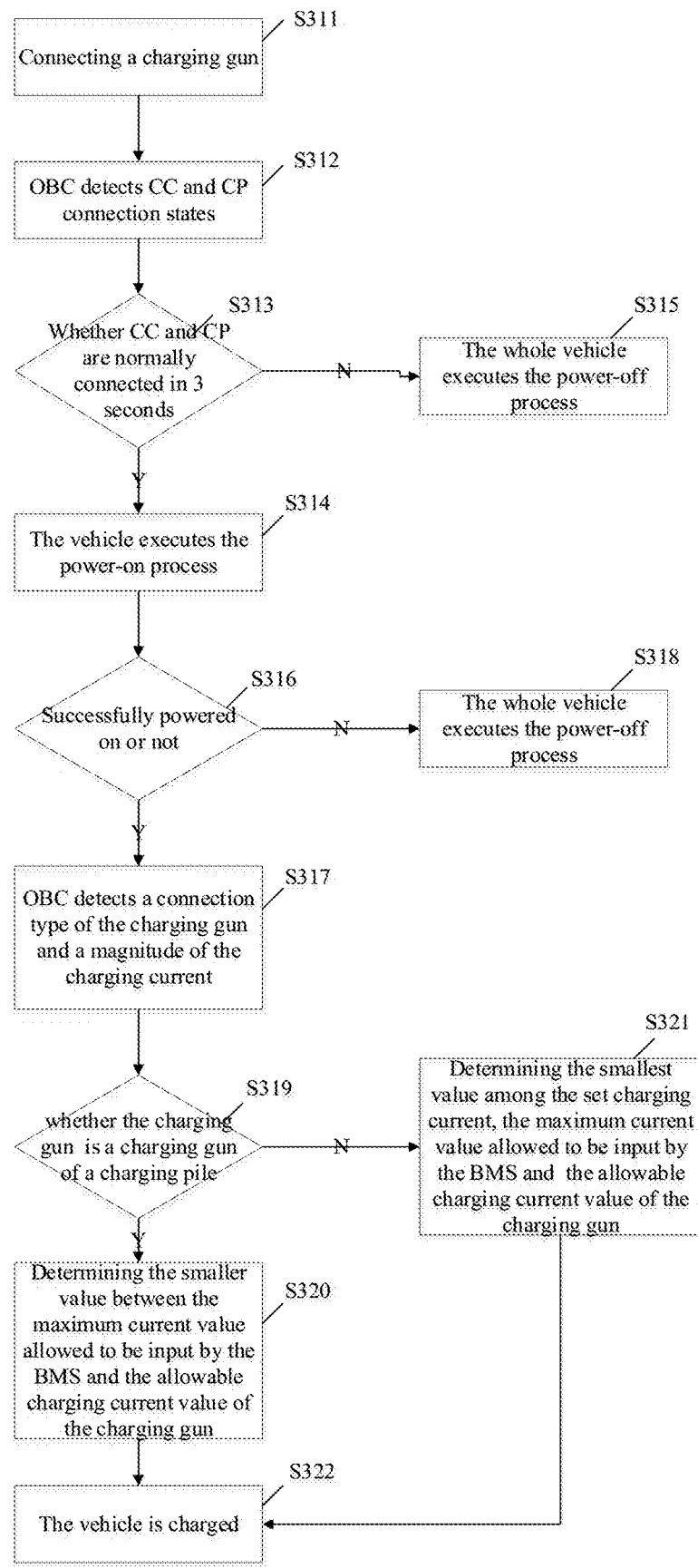
FIG. 3 is a flow chart of implementing the charging control method according to the embodiment of the present application.

Please refer to FIG. 3, which shows a flow chart of implementing the charging control method according to the embodiment of the present application.

As shown in FIG. 3, in step S311, it is detected whether the charging gun is plugged in for connection, and when it is detected that the charging gun is connected, step S312 is performed.

In step S312, the OBC detects CC and CP connection states, and then step S313 is performed.

In step S313, it is detected whether the connection confirm signal and the control confirm signal are received within 3 seconds to determine whether the CC and the CP are normally connected; and if so, step S314 is performed; otherwise, step S315 is performed.

In step S314, the vehicle executes the power-on process under the control of the vehicle controller. In step S315, the vehicle executes the power-off process under the control of the vehicle controller.

In step S316, it is determined whether the vehicle is successfully powered on; if so, step S317 is performed; otherwise, step S318 is performed to execute the power-off process.

In step S317, the OBC detects a connection type of the charging gun and a magnitude of the charging current, and then step S319 is performed.

In step S319, it is determined through the connection type determined in step S317 whether the charging gun connected to the on-board charger is a charging gun of a charging pile; if yes, step S320 is performed; otherwise, step S321 is performed.

In step S320, the smaller value between the maximum current value allowed to be input by the BMS and the allowable charging current value of the charging gun is determined.

In step S321, the smallest value among the maximum current value allowed to be input by the BMS, the allowable charging current value of the charging gun, and the set charging current is determined.

In step S322, the battery pack is charged according to the smaller value or the smallest value determined in step S320 or S321.

Figure 4:
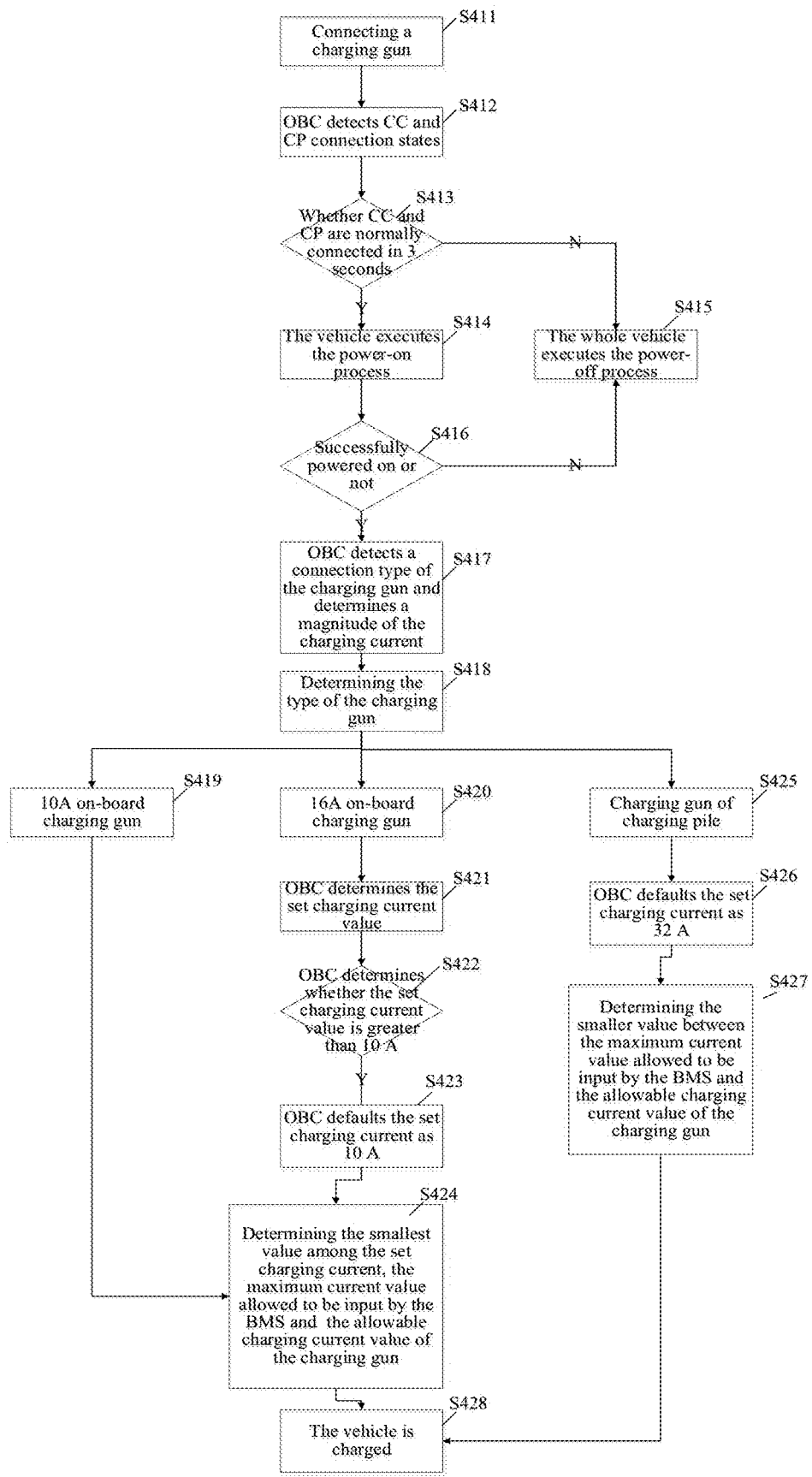
FIG. 4 is a flow chart of implementing the charging control method according to the preferred embodiment of the present application.

Please refer to FIG. 4, which shows a flow chart of implementing the charging control method according to the preferred embodiment of the present application.

As shown in FIG. 4, in step 411, it is detected whether a charging gun is plugged in for connection, and when it is detected that the charging gun is connected, step S412 is performed.

In step 412, the OBC detects CC and CP connection states, and then step S413 is performed.

In step S413, it is detected whether the charging connection confirm signal and the control confirm signal are received within 3 seconds to determine whether the CC and the CP are normally connected; and if so, step S414 is performed; otherwise, step S415 is performed.

In step S414, the vehicle executes the power-on process under the control of the vehicle controller. In step S415, the vehicle executes the power-off process under the control of the vehicle controller.

In step S416, it is determined whether the vehicle is successfully powered on; if so, step S417 is performed; otherwise, step S415 is performed to execute the power-off process.

In step 417, the OBC detects a connection type of the charging gun and a magnitude of the charging current, and then step S419 is performed.

In step S418, the specific type of the charging gun connected to the on-board charger is determined by the connection type determined in step S417.

In step S419, if it is determined that the charging gun connected to the on-board charger is a 10 A on-board charging gun, step S424 is performed.

In step S420, if it is determined that the charging gun connected to the on-board charger is a 16 A on-board charging gun, step S421 is performed.

In step S421, the OBC determines a magnitude of the preset charging current value, and then step S422 is performed to determine whether the charging current setting value is greater than 10 A; if so, step S423 is performed; otherwise, step S424 is performed directly.

In step S423, the on-board charger defaults the preset charging current to 10 A, and then step S424 is performed.

In step S424, the smallest value among the maximum current value allowed to be input by the BMS, the allowable charging current value of the charging gun, and the set charging current is determined.

In step S425, if it is determined that the charging gun connected to the on-board charger is a charging gun of a charging pile, step S426 is performed.

In step S426, the on-board charger defaults the preset charging current to 32 A, and then step S427 is performed.

In step S427, the smaller value between the maximum current value allowed to be input by the BMS and the allowable charging current value of the charging gun is determined.

In step S428, the battery pack is charged by the vehicle according to the smaller value or the smallest value determined in step S424 or S427.

Figure 5:
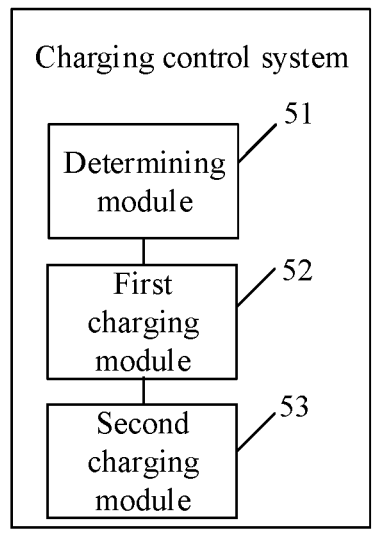
FIG. 5 is a schematic structural diagram of a charging control system according to an embodiment of the present application.

Another object of the present application aims to provide a charging control system, which is applied to an on-board charger of a vehicle, the vehicle further includes a battery pack, wherein, please refer to FIG. 5, which shows a schematic structural diagram of the charging control system according to an embodiment of the present application. The system includes:

a determining module 51 configured for, when it is detected that a charging device is connected, determining a type of the charging device, a first charging current upper limit value of the charging device, a second charging current upper limit value of the battery pack and a preset charging current value;

a first charging module 52 configured for, when the charging device includes a charging gun of a charging pile, charging the battery pack according to the smaller value between the first charging current upper limit value and the second charging current upper limit value; and a second charging module 53 configured for, when the charging device includes an on-board charging gun, charging the battery pack according to the smallest value among the first charging current upper limit value, the second charging current upper limit value and the preset charging current value.

In the system according to the present embodiment, when it is detected that the charging device is connected, the type of the charging device, the determining module 51 determines the first charging current upper limit value of the charging device, the second charging current upper limit value of the battery pack and the preset charging current; when the charging device is the charging gun of the charging pile, the first charging module 52 charges the battery pack according to the smaller value between the first charging current upper limit value and the second charging current upper limit value; and when the charging device is the on-board charging gun, the second charging module 53 charges the battery pack according to the smallest value among the first charging current upper limit value, the second charging current upper limit value and the preset charging current value. When the battery pack is charged by using the charging gun of the charging pile, the battery pack is charged according to the smaller value between the first charging current upper limit value of the charger and the second charging current upper limit value of the battery pack, so that the charging efficiency is improved to the greatest extent, and the charging time is shortened on the premise of ensuring safety, and a situation that the charging time is prolonged as the charging current is set to be too small is avoided; and when the battery pack is charged by using the on-board charging gun, the battery pack is charged according to the smallest value among the first charging current upper limit value of the charger, the second charging current upper limit value of the battery pack, and the preset charging current value, which meets the personalized charging requirements of the users on the premise of ensuring the safety.

Optionally, in the charging control system, the first charging module 52 is specifically configured for, when the charging device includes the charging gun of the charging pile, setting the preset charging current value as a third charging current upper limit value, and charging the battery pack according to the smaller value between the first charging current upper limit value and the second charging current upper limit value, wherein the third charging current upper limit value is a charging current upper limit value of the on-board charger.

Optionally, in the charging control system, the first charging module 52 is specifically configured for, when the charging device includes the charging gun of the charging pile, setting the preset charging current value as a third charging current upper limit value, and charging the battery pack according to the smaller value between the first charging current upper limit value and the second charging current upper limit value, wherein the third charging current upper limit value is a charging current upper limit value of the on-board charger.

Optionally, in the charging control system, the second charging module 53 includes:

a first charging unit configured for, when the charging device includes a 10 A on-board charging gun, charging the battery pack according to the smallest value among the first charging current upper limit value, the preset charging current value and the second charging current upper limit value;

a second charging unit configured for, when the charging device includes a 16 A on-board charging gun, and when the preset charging current value is greater than a fourth charging current upper limit value, charging the battery pack according to the smallest value among the first charging current upper limit value, the second charging current upper limit value and the fourth charging current upper limit value; wherein, the fourth charging current upper limit value is an operating current upper limit value of a household socket; and a third charging unit configured for, when the charging device includes the 16 A on-board charging gun, and when the preset charging current value is less than or equal to the fourth charging current upper limit value, charging the battery pack according to the smallest value among the first charging current upper limit value, the second charging current upper limit value and the preset charging current value.

Optionally, in the charging control system, the vehicle further includes a vehicle controller, the vehicle controller is electrically connected to the on-board charger, and the system further includes:

a first control module configured for, before when it is detected that the charging device is connected, determining the type of the charging device, the first charging current upper limit value of the charging device, the second charging current upper limit value of the battery pack and the preset charging current value, when it is detected that the charging device is plugged in the on-board charger, and when a charging connection confirm signal and a control confirm signal are received within a preset time, sending a charging signal to the vehicle controller, so that the vehicle controller executes a charging power-on process and determines that the charging device is connected; and a second control module configured for, when it is detected that the charging device is plugged in the on-board charger, and when the charging connection confirm signal or the control confirm signal is not received within the preset time, sending a power-off signal to the vehicle controller, so that the vehicle controller executes a charging power-off process.

Optionally, in the charging control system, different types of charging devices are configured with resistor modules of different resistance values, and the charging connection confirm signal includes the resistance value of the resistor module; and the determining module 51 includes:

a first determining unit configured for determining a resistance value of the charging device according to the charging connection confirm signal; and a second determining unit configured for determining the type of the charging device according to the resistance value.

Yet another object of the present application also aims to provide a vehicle, wherein the vehicle includes an on-board charger, the vehicle further includes a battery pack, and the vehicle further includes the charging control system as described above.

The charging control system and the vehicle have the same advantages as that of the above-mentioned charging control method relative to the prior art, which will not be elaborated herein.

In conclusion, according to the charging control method, the charging control and the vehicle according to the present application, when the battery pack is charged by using the charging gun of the charging pile, the battery pack is charged according to the smaller value between the first charging current upper limit value of the charger and the second charging current upper limit value of the battery pack, so that the charging efficiency is improved to the greatest extent, and the charging time is shortened on the premise of ensuring safety, and a situation that the charging time is prolonged as the charging current is set to be too small is avoided; and when the battery pack is charged by using the on-board charging gun, the battery pack is charged according to the smallest value among the first charging current upper limit value of the charger, the second charging current upper limit value of the battery pack, and the preset charging current value, which meets the personalized charging requirements of the users on the premise of ensuring the safety.

It can be clearly understood by a person skilled in the art that, for the sake of convenience and brevity, a detailed working process of the foregoing system, apparatus, and unit may refer to a corresponding process in the foregoing method embodiments, and will not be elaborated herein.

The above-described apparatus embodiments are merely illustrative, wherein the units that are described as separate components may or may not be physically separate, and the components that are displayed as units may or may not be physical units; in other words, they may be located at the same one location, and may also be distributed to a plurality of network units. Part or all modules therein may be selected according to actual needs to realize the objective of achieving the technical solution of the embodiment. A person skilled in the art can understand and implement the technical solutions without paying creative work.

Each component embodiment of the present application may be implemented by hardware, or by software modules that are operated on one or more processors, or by a combination thereof. A person skilled in the art should understand that some or all of the functions of some or all of the components of the computing-processing device according to the embodiments of the present application may be implemented by using a microprocessor or a digital signal processor (DSP) in practice. The present application may also be implemented as device or apparatus programs (for example, computer programs and computer program products) for implementing part of or the whole of the method described herein. Such programs for implementing the present application may be stored in a computer-readable medium, or may be in the form of one or more signals. Such signals may be downloaded from an Internet website, or provided on a carrier signal, or provided in any other forms.

Figure 6:
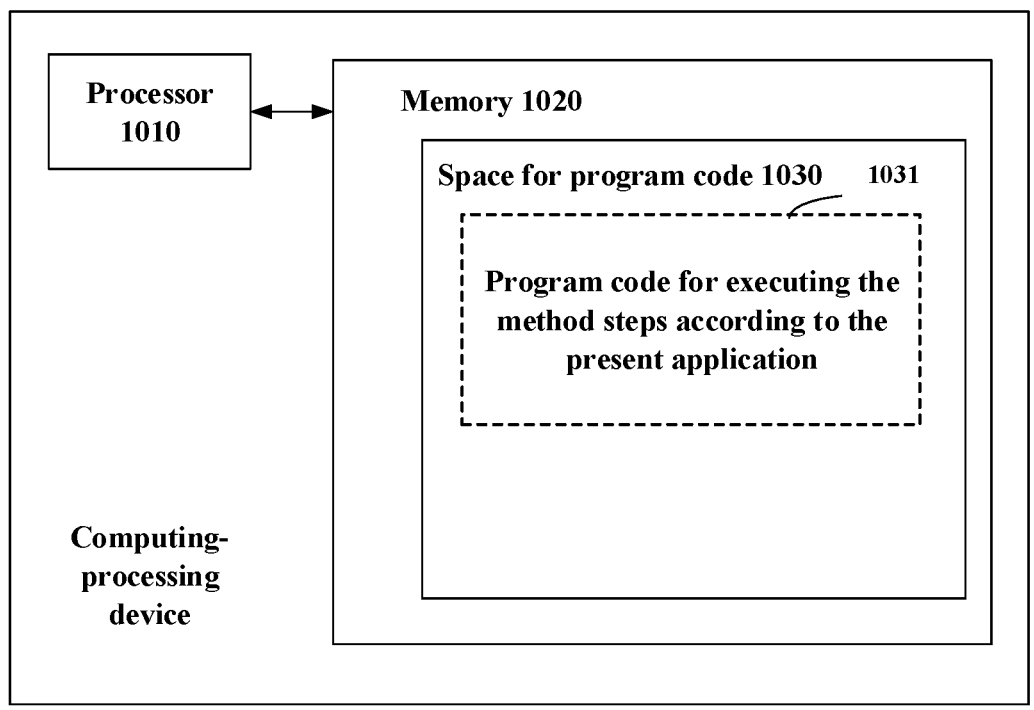
FIG. 6 schematically shows a block diagram of a computing-processing device for executing the method according to the present application.
Figure 7:
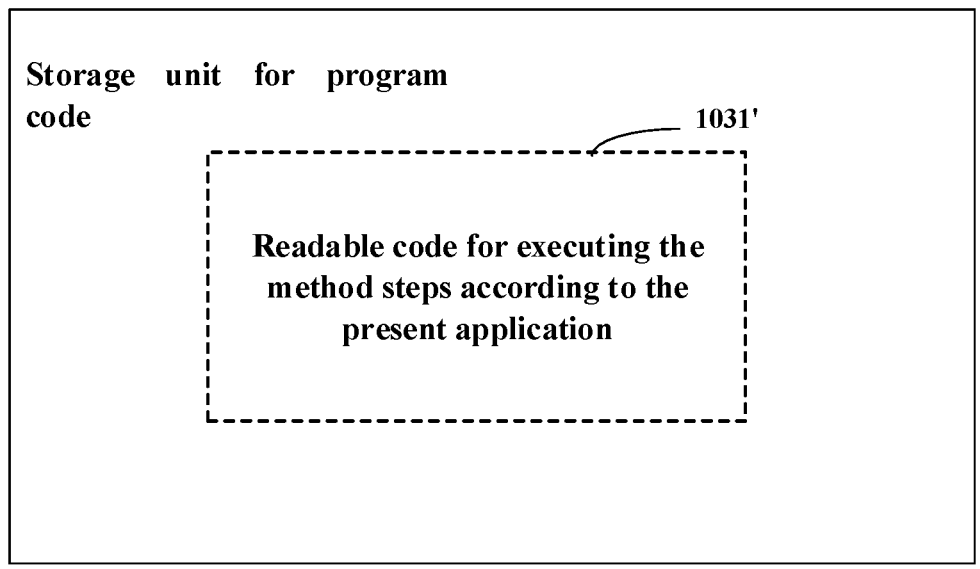
FIG. 7 schematically shows a storage unit for holding or carrying a program code for implementing the method according to the present application.

For example, FIG. 6 shows a computing-processing device that can implement the method according to the present application. The computing-processing device traditionally includes a processor 1010 and a computer program product or computer-readable medium in the form of a memory 1020. The memory 1020 may be electronic memories such as flash memory, Electrically Erasable Programmable Read Only Memory (EEPROM), EPROM, hard disk or ROM. The memory 1020 has a storage space 1030 of a program code 1031 for implementing any steps of the above method. For example, the storage space 1030 for program code may contain program codes 1031 for individually implementing each of the steps of the above method. Those program codes may be read from one or more computer program products or be written into the one or more computer program products. These computer program products include program code carriers such as hard disks, compact disks (CD), memory cards, or floppy disks. Such computer program products are usually portable or fixed storage units as shown in FIG. 7. The storage unit may have storage segments or storage spaces with similar arrangement to the memory 1020 of the computing-processing device in FIG. 6. The program codes may for example be compressed in a suitable form. Generally, the storage unit contains a computer-readable code 1031', which can be read by a processor like 1010. When those codes are executed by the computing-processing device, the codes cause the computing-processing device to implement each of the steps of the method described above.

The "one embodiment", "an embodiment" or "one or more embodiments" as used herein means that particular features, structures or characteristics described with reference to an embodiment are included in at least one embodiment of the present application. Moreover, it should be noted that here an example using the wording "in an embodiment" does not necessarily refer to the same one embodiment.

Many details are discussed in the specification provided herein. However, it can be understood that the embodiments of the present application may be implemented without those concrete details. In some of the embodiments, well-known processes, structures and techniques are not described in detail, so as not to affect the understanding of the description.

In the claims, any reference signs between parentheses should not be construed as limiting the claims. The word "comprise" does not exclude elements or steps that are not listed in the claims. The word "a" or "an" preceding an element does not exclude the existing of a plurality of such elements. The present application may be implemented by means of hardware comprising several different elements and by means of a properly programmed computer. In unit claims that list several devices, some of those apparatuses may be embodied by the same item of hardware. The words first, second, third and so on do not denote any order. Those words may be interpreted as names.

Those described above are merely preferred embodiments of this application, but are not intended to limit this application. Any modifications, equivalent substitutions and improvements made without departing from the spirit and principle of this application shall all fall in the scope of protection of this application.

The foregoing descriptions are merely detailed embodiments of the present application, but the protection scope of the present application is not limited thereto. Any person skilled in the art can easily think of changes or substitutions within the technical scope of the present application, and all the changes or substitutions should be covered by the protection scope of the present application. Therefore, the protection scope of the present application should be subjected to the protection scope of the claims.

Finally, it should be noted that the above embodiments are merely intended to explain the technical solutions of the present application, and not to limit them. Although the present application is explained in detail by referring to the above embodiments, a person skilled in the art should understand that he can still modify the technical solutions set forth by the above embodiments, or make equivalent substitutions to part of the technical features of them. However, those modifications or substitutions do not make the essence of the corresponding technical solutions depart from the spirit and scope of the technical solutions of the embodiments of the present application.

The invention claimed is:

1. A charging control method applied to an on-board charger of a vehicle, wherein the vehicle further comprises a battery pack, and the method comprises:

by one or more processors, when it is detected that a charging device is connected, determining a type of the charging device, a first charging current upper limit value of the charging device, a second charging current upper limit value of the battery pack and a preset charging current value;

by one or more processors, when the charging device comprises a charging gun of a charging pile, charging the battery pack according to a smaller value between the first charging current upper limit value and the second charging current upper limit value; and by one or more processors, when the charging device comprises an on-board charging gun, charging the battery pack according to a smallest value among the first charging current upper limit value, the second charging current upper limit value and the preset charging current value.

2. The method according to claim 1, wherein when the charging device comprises the charging gun of the charging pile, charging the battery pack according to the smaller value between the first charging current upper limit value and the second charging current upper limit value comprises:

when the charging device comprises the charging gun of the charging pile, setting the preset charging current value as a third charging current upper limit value, and charging the battery pack according to the smaller value between the first charging current upper limit value and the second charging current upper limit value, wherein the third charging current upper limit value is a charging current upper limit value of the on-board charger.

3. The method according to claim 1, wherein when the charging device comprises the on-board charging gun, charging the battery pack according to the smallest value among the first charging current upper limit value, the second charging current upper limit value and the preset charging current value comprises:

when the charging device comprises a 10 A on-board charging gun, charging the battery pack according to the smallest value between the first charging current upper limit value, the preset charging current value and the second charging current upper limit value;

when the charging device comprises a 16 A on-board charging gun, and when the preset charging current value is greater than a fourth charging current upper limit value, charging the battery pack according to a smallest value among the first charging current upper limit value, the second charging current upper limit value and the fourth charging current upper limit value; wherein, the fourth charging current upper limit value is an operating current upper limit value of a household socket; and when the charging device comprises the 16 A on-board charging gun, and when the preset charging current value is less than or equal to the fourth charging current upper limit value, charging the battery pack according to the smallest value among the first charging current upper limit value, the second charging current upper limit value and the preset charging current value.

4. The method according to claim 1, wherein the vehicle further comprises a vehicle controller, the vehicle controller is electrically connected to the on-board charger, and before when it is detected that the charging device is connected, determining the type of the charging device, the first charging current upper limit value of the charging device, the second charging current upper limit value of the battery pack and the preset charging current value, the method further comprises:

when it is detected that the charging device is plugged in the on-board charger, and when a charging connection confirm signal and a control confirm signal are received within a preset time, sending a charging signal to the vehicle controller, so that the vehicle controller executes a charging power-on process and determines that the charging device is connected; and when it is detected that the charging device is plugged in the on-board charger, and when the charging connection confirm signal or the control confirm signal is not received within the preset time, sending a power-off signal to the vehicle controller, so that the vehicle controller executes a charging power-off process.

5. The method according to claim 4, wherein different types of charging devices are configured with resistor modules of different resistance values, and the charging connection confirm signal comprises the resistance value of the resistor module; and determining the type of the charging device comprises:

determining a resistance value of the charging device according to the charging connection confirm signal; and determining the type of the charging device according to the resistance value.

6. A non-transitory computer-readable medium, wherein the non-transitory computer-readable medium stores a computer readable code, and when the computer readable code is executed, the charging control method according to claim 1 is performed.

7. A charging control system applied to an on-board charger of a vehicle, wherein the vehicle further comprises a battery pack, and the system comprises:

one or more processors and a storage apparatus; and the storage apparatus stores a computer program which, when executed by the processor, perform the operations comprising:

when it is detected that a charging device is connected, determining a type of the charging device, a first charging current upper limit value of the charging device, a second charging current upper limit value of the battery pack and a preset charging current value;

when the charging device comprises a charging gun of a charging pile, charging the battery pack according to a smaller value between the first charging current upper limit value and the second charging current upper limit value; and when the charging device comprises an on-board charging gun, charging the battery pack according to a smallest value among the first charging current upper limit value, the second charging current upper limit value and the preset charging current value.

8. The charging control system according to claim 7, wherein the operation of when the charging device comprises an on-board charging gun, charging the battery pack according to the smallest value among the first charging current upper limit value, the second charging current upper limit value and the preset charging current value comprises:
  when the charging device comprises a 10 A on-board charging gun, charging the battery pack according to the smallest value among the first charging current upper limit value, the preset charging current value and the second charging current upper limit value;
  when the charging device comprises a 16 A on-board charging gun, and when the preset charging current value is greater than a fourth charging current upper limit value, charging the battery pack according to a smallest value among the first charging current upper limit value, the second charging current upper limit value and the fourth charging current upper limit value; wherein, the fourth charging current upper limit value is an operating current upper limit value of a household socket; and
  when the charging device comprises the 16 A on-board charging gun, and when the preset charging current value is less than or equal to the fourth charging current upper limit value, charging the battery pack according to the smallest value among the first charging current upper limit value, the second charging current upper limit value and the preset charging current value.

9. The charging control system according to claim 7, wherein the vehicle further comprises a vehicle controller, the vehicle controller is electrically connected to the on-board charger, and the system further comprises:
  before when it is detected that the charging device is connected, determining the type of the charging device, the first charging current upper limit value of the charging device, the second charging current upper limit value of the battery pack and the preset charging current value, when it is detected that the charging device is plugged in the on-board charger, and when a charging connection confirm signal and a control confirm signal are received within a preset time, sending a charging signal to the vehicle controller, so that the vehicle controller executes a charging power-on process and determines that the charging device is connected; and
  when it is detected that the charging device is plugged in the on-board charger, and when the charging connection confirm signal or the control confirm signal is not received within the preset time, sending a power-off signal to the vehicle controller, so that the vehicle controller executes a charging power-off process.

10. The charging control system according to claim 9, wherein different types of charging devices are configured with resistor modules of different resistance values, and the charging connection confirm signal comprises the resistance value of the resistor module; and the determining module comprises:
  determining a resistance value of the charging device according to the charging connection confirm signal; and
  determining the type of the charging device according to the resistance value.

11. A vehicle, wherein the vehicle comprises an on-board charger, the vehicle further comprises a battery pack, and the vehicle further comprises the charging control system according to claim 7.

12. The vehicle according to claim 11, wherein the operation of when the charging device comprises an on-board charging gun, charging the battery pack according to the smallest value among the first charging current upper limit value, the second charging current upper limit value and the preset charging current value comprises:
  when the charging device comprises a 10 A on-board charging gun, charging the battery pack according to the smallest value among the first charging current upper limit value, the preset charging current value and the second charging current upper limit value;
  when the charging device comprises a 16 A on-board charging gun, and when the preset charging current value is greater than a fourth charging current upper limit value, charging the battery pack according to a smallest value among the first charging current upper limit value, the second charging current upper limit value and the fourth charging current upper limit value; wherein, the fourth charging current upper limit value is an operating current upper limit value of a household socket; and
  when the charging device comprises the 16 A on-board charging gun, and when the preset charging current value is less than or equal to the fourth charging current upper limit value, charging the battery pack according to the smallest value among the first charging current upper limit value, the second charging current upper limit value and the preset charging current value.

13. The vehicle according to claim 11, wherein the vehicle further comprises a vehicle controller, the vehicle controller is electrically connected to the on-board charger, and the system further comprises:
  before when it is detected that the charging device is connected, determining the type of the charging device, the first charging current upper limit value of the charging device, the second charging current upper limit value of the battery pack and the preset charging current value, when it is detected that the charging device is plugged in the on-board charger, and when a charging connection confirm signal and a control confirm signal are received within a preset time, sending a charging signal to the vehicle controller, so that the vehicle controller executes a charging power-on process and determines that the charging device is connected; and
  when it is detected that the charging device is plugged in the on-board charger, and when the charging connection confirm signal or the control confirm signal is not received within the preset time, sending a power-off signal to the vehicle controller, so that the vehicle controller executes a charging power-off process.

14. The vehicle according to claim 13, wherein different types of charging devices are configured with resistor modules of different resistance values, and the charging connection confirm signal comprises the resistance value of the resistor module; and the determining module comprises:
  determining a resistance value of the charging device according to the charging connection confirm signal; and
  determining the type of the charging device according to the resistance value.

* * * * *